USO10268642B1

(12) United States Patent
Leung et al.

(10) Patent No.: US 10,268,642 B1
(45) Date of Patent: Apr. 23, 2019

(54) NORMALIZING INSUFFICIENT SIGNALS BASED ON ADDITIONAL INFORMATION (71) Applicant: Banjo, Inc., Park City, UT (US)

(72) Inventors: KW Justin Leung, Redwood City, CA (US); Michael Avner Urbach, Redwood City, CA (US); Damien Patton, Park City, UT (US); Christian Gratton, Las Vegas, NV (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/170,325

(22) Filed: Oct. 25, 2018

Related U.S. Application Data (60) Provisional application No. 62/664,001, filed on Apr. 27, 2018, provisional application No. 62/667,337, filed on May 4, 2018, provisional application No. 62/667,343, filed on May 4, 2018, provisional application No. 62/667,616, filed on May 7, 2018, provisional application No. 62/685,814, filed on Jun. 15, 2018, provisional application No. 62/686,791, filed on Jun. 19, 2018, provisional application No. 62/691,806, filed on Jun. 29, 2018.

(51) Int. Cl.
G06F 16/25 (2019.01)
G06F 16/29 (2019.01)
(52) U.S. Cl.
CPC .......... *G06F 16/258* (2019.01); *G06F 16/29* (2019.01)
(58) Field of Classification Search
CPC ................................ G06F 16/258; G06F 16/29
USPC ....................................................... 707/736
See application file for complete search history.

(56) References Cited

U.S. PATENT DOCUMENTS

| 7,203,635 | B2 * | 4/2007 | Oliver | G06K 9/6293 345/156 |
|---|---|---|---|---|
| 8,914,044 | B2 * | 12/2014 | Raman | H04W 4/021 455/456.3 |
| 9,134,398 | B2 * | 9/2015 | Dupray | G01S 1/026 |
| 9,372,922 | B2 * | 6/2016 | Shaashua | H04W 4/70 |
| 9,703,841 | B1 * | 7/2017 | Hwang | G06F 16/957 |
| 2001/0022558 | A1 * | 9/2001 | Karr, Jr. | G01S 1/026 342/450 |
| 2006/0235833 | A1 * | 10/2006 | Smith | H04W 76/50 |
| 2014/0067951 | A1 * | 3/2014 | Sheinfeld | H04L 67/22 709/204 |
| 2017/0142200 | A1 * | 5/2017 | Kodner | H04L 67/22 |

* cited by examiner

*Primary Examiner* — Cam Linh T Nguyen
(74) *Attorney, Agent, or Firm* — Michael B. Dodd (57) ABSTRACT The present invention extends to methods, systems, and computer program products for normalizing insufficient signals based on additional information. Evidence of an event is detected from a raw signal. It is determined signal characteristics of the raw signal are insufficient to normalize the raw signal along at least one of: a time, location, or context dimension into a Time, Location, Context (TLC) format. In one aspect, an additional raw signal related to the detected evidence is accessed from another signal source. In another aspect, a previously detected event related to the detected evidence is received from a geo cell database. The raw signal is normalized into the Time, Location, Context (TLC) format, including deriving at least one of: the time dimension, the location dimension, or the context dimension from a combination of the signal characteristics and characteristics of the other signal and/or characteristics of the previously detected event.

15 Claims, 7 Drawing Sheets

NORMALIZING INSUFFICIENT SIGNALS BASED ON ADDITIONAL INFORMATION

CROSS-REFERENCE TO RELATED APPLICATIONS

This application claims the benefit of U.S. Provisional Patent Application Ser. No. 62/664,001, entitled "Normalizing Different Types Of Ingested Signals Into A Common Format", filed Apr. 27, 2018, which is incorporated herein in its entirety. This application claims the benefit of U.S. Provisional Patent Application Ser. No. 62/667,337, entitled "On Demand Signal Acquisition Trigger From Evidence Of Lice Events", filed May 4, 2018, which is incorporated herein in its entirety. This application claims the benefit of U.S. Provisional Patent Application Ser. No. 62/667,343, entitled "Using Prior Events As Signals During Signal Ingestion", filed May 4, 2018, which is incorporated herein in its entirety. This application claims the benefit of U.S. Provisional Patent Application Ser. No. 62/667,616, entitled, "Normalizing Different Types Of Ingested Signals Into A Common Format", filed May 7, 2018, which is incorporated herein in its entirety. This application claims the benefit of U.S. Provisional Patent Application Ser. No. 62/685,814, entitled "Ingesting Streaming Signals", filed Jun. 15, 2018, which is incorporated herein in its entirety. This application claims the benefit of U.S. Provisional Patent Application Ser. No. 62/686,791, entitled, "Normalizing Signals", filed Jun. 19, 2018, which is incorporated herein in its entirety. This application claims the benefit of U.S. Provisional Patent Application Ser. No. 62/691,806, entitled "Ingesting Streaming Signals", filed Jun. 29, 2018, which is incorporated herein in its entirety.

BACKGROUND

1. Background and Relevant Art

Entities (e.g., parents, guardians, teachers, social workers, first responders, hospitals, delivery services, media outlets, government entities, etc.) may desire to be made aware of relevant events as close as possible to the events' occurrence (i.e., as close as possible to "moment zero"). Different types of ingested signals (e.g., social media signals, web signals, and streaming signals) can be used to identify events. Different types of signals can include different data types and different data formats. Handling different types and formats of data introduces inefficiencies into subsequent event detection processes, including when determining if different signals relate to the same event. Further, individual ingested signals may contain insufficient information to identify an event.

BRIEF SUMMARY

Examples extend to methods, systems, and computer program products for normalizing insufficient signals based on additional information.

A raw signal is ingested from a signal source. The raw signal includes a time stamp, an indication of a signal type, an indication of a signal source, and content from the signal source. Evidence of an event at a location is detected from signal characteristics. It is determined that signal characteristics of the raw signal are insufficient to normalize the signal along at least one of: a time dimension, a location dimension, or a context dimension into a Time, Location, Context (TLC) format.

In one aspect, additional information is obtained from an additional raw signal. A signal request requesting additional signals related to the detected evidence is triggered in response to determining that the signal characteristics are insufficient. An additional raw signal related to the detected evidence is accessed from another signal source. The raw signal is normalized into the Time, Location, Context (TLC) format. Normalizing the raw signal includes deriving at least one of: the time dimension, the location dimension, or the context dimension from a combination of the signal characteristics and characteristics of the other signal.

In another aspect, additional information is obtained from a previously detected event. A request requesting previously detected events at or near the location of the ingested raw signal is sent to a geo cell database in response to determining that the signal characteristics are insufficient. A previously detected event related to the detected evidence is received from the geo cell database. The raw signal is normalized into the Time, Location, Context (TLC) format. Normalizing the raw signal includes deriving at least one of: the time dimension, the location dimension, or the context dimension from a combination of the signal characteristics and characteristics of the previously detected event.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to methods, systems, and computer program products for normalizing insufficient signals based on additional information.

Entities (e.g., parents, guardians, teachers, social workers, first responders, hospitals, delivery services, media outlets, government entities, etc.) desire to be made aware of relevant events as close as possible to the events' occurrence (i.e., as close as possible to "moment zero"). Event relevancy can differ between entities and may be based on entity specific desires. For example, parents may be interested in any police presence at or near their children's school. However, the parents are not necessarily interested in police presence in other places. As another example, an ambulance service may be interested in motor vehicle accidents with injuries that occur within their area of operation. However, the ambulance service is not necessarily interested in accidents without injuries or accidents that occur outside their area of operation.

In general, signal ingestion modules ingest different types of raw structured and/or raw unstructured signals on an ongoing basis. Different types of raw signals can include different data media types and different data formats, including Web signals. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a raw signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingested raw signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Features of normalized signals can include: signal type, signal source, signal content, Time (T) dimension, Location (L) dimension, Context (C) dimension, other circumstances of signal creation, etc.

If the characteristics a raw signal provide insufficient information to derive one or more of: Time (T), Location (L), or Context (C) dimensions, signal enrichment services can refer to/access supplemental enriching data. Signal ingestion modules can then use the supplemental enriching data to derive any of: Time (T), Location (L), and Context (C) dimensions. In one aspect, signal enrichment services request additional raw signals from one or more signal sources. The signal ingestion modules use characteristics of one or more additional raw signals to infer/derive one or more of: a Time (T) dimension, a Location (L) dimension, or Context (C) dimension for the raw signal.

The signal ingestion modules can use defined signal acquisition schemes for a plurality of signal sources (data providers), such as, social networks, social broadcasts, traffic reports, traffic cameras, live weather, etc. A signal acquisition scheme for a signal source can specify a signal acquisition volume corresponding to specified geographic locations at specified time intervals. A signal acquisition scheme can maximize signal acquisition up to some threshold below that permitted by a signal acquisition policy of a signal source. Thus, accessing signals from a signal source in accordance with a signal acquisition scheme does not fully consume that entity's allocated signal acquisition with the signal source. Some amount of allocated signal acquisition is held back to handle on-demand signal access requests (that can potentially occur at any time).

As such, the signal ingestion modules can acquire signals from a plurality of signal sources in accordance with a plurality of corresponding signal acquisition schemes. The signal ingestion modules analyze raw signals from the plurality of signal sources to attempt to identify Time (T), Location (L), and Context (C) dimensions of occurring live events (e.g., fire, police response, mass shooting, traffic accident, natural disaster, storm, active shooter, concerts, protests, etc.).

Signal acquisition schemes can bias towards acquiring raw signals corresponding to locations where events are more likely to occur, for example, in heavier populated areas. On the other hand, signal acquisition schemes may be configured to less frequently acquire signals or forgo signal acquisition, at least from some signal sources, for locations where events are less likely to occur.

In one aspect, signal enrichment services trigger an on-demand signal acquisition request for an additional raw signal (the supplemental enriching data) from another signal source. The on-demand request is an exception to the signal acquisition scheme defined for the other signal source. However, the on-demand signal acquisition request is unlikely to violate a signal acquisition policy of the other signal source, since (in accordance with a defined scheme) some amount of allocated signal acquisition is held back to accommodate on-demand signal acquisition requests.

In another aspect, when a signal includes insufficient information to derive one or more of: Time (T), Location (L), or Context (C) dimensions, signal enrichment services can refer to/access supplemental enriching data from previously detected events. Signal ingestion modules can then use the supplemental enriching data to derive any of: Time (T), Location (L), and Context (C) dimensions.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, time dimensions, location dimensions, context dimensions, search terms, geo cell entries, geo cell subsets, events, signal access policies, signal access schemes, event evidence, signal acquisition requests, queries, additional raw signals, previously detected events, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, time dimensions, location dimensions, context dimensions, search terms, geo cell entries, geo cell subsets, events, signal access policies, signal access schemes, event evidence, signal acquisition requests, queries, additional raw signals, previously detected events, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| Geohash Length/Precision | width × height |
| --- | --- |
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 9 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or pre-process) raw signals into normalized signals to increase efficiency and effectiveness of subsequent computing activities, such as, event detection, event notification, etc., that utilize the normalized signals. For example, signal ingestion modules can normalize raw signals, including raw streaming signals, into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a raw signal. Time, Location, and Context dimensions for a raw signal can be extracted/derived/inferred from metadata, characteristics of the raw signal, characteristics of other raw signals, characteristics of previously detected events, etc.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested raw signal includes sufficient expressly defined time, location, and context information upon ingestion. The expressly defined time, location, and context information is used to determine Time, Location, and Context dimensions for the ingested raw signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources. Other data sources can include additional raw signals and previously detected events.

In additional aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

Figure 1A:
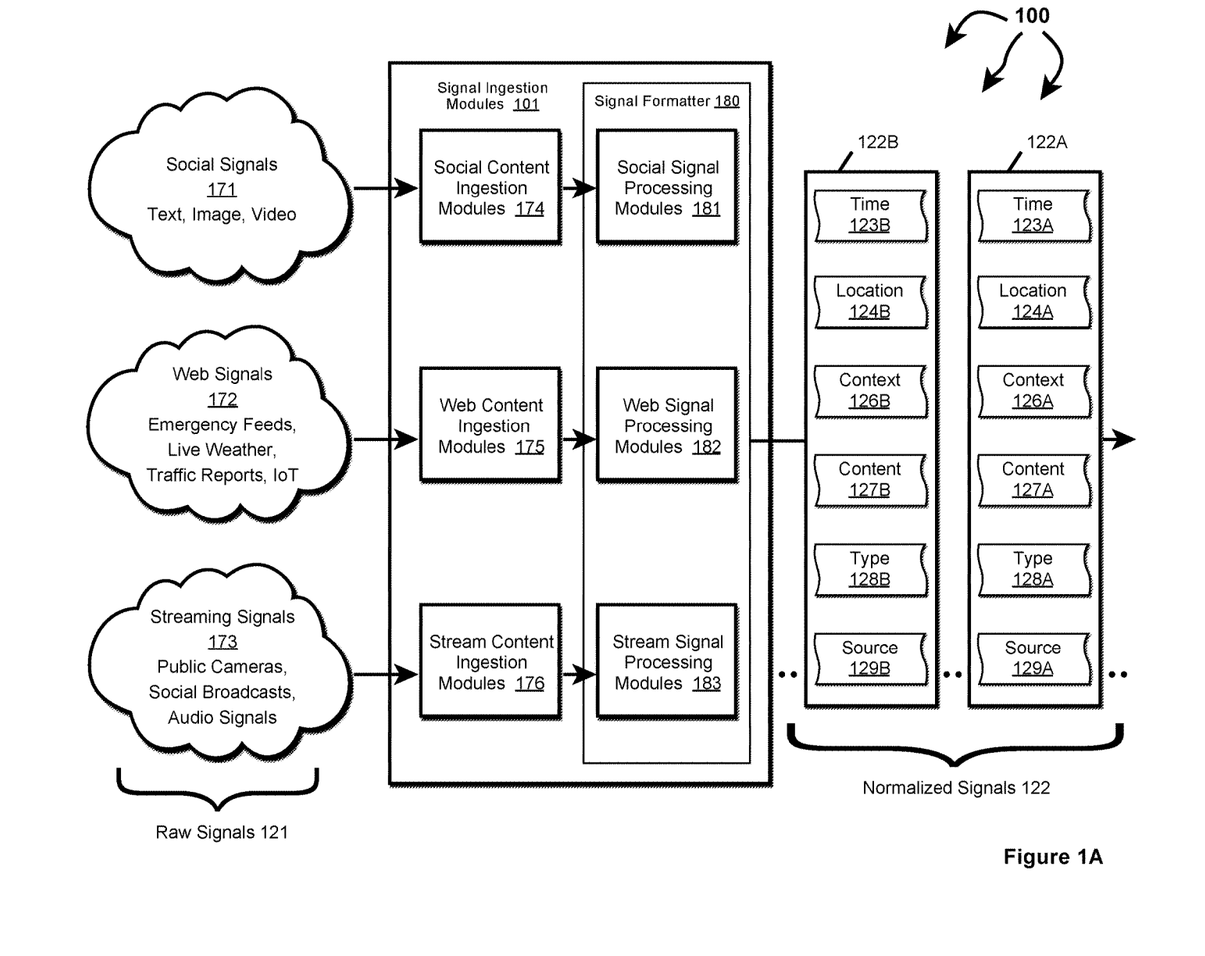
FIG. 1A illustrates an example computer architecture that facilitates normalizing ingesting signals.

FIG. 1A depicts part of computer architecture 100 that facilitates ingesting and normalizing signals. As depicted, computer architecture 100 includes signal ingestion modules 101, social signals 171, web signals 172, and streaming signals 173. Signal ingestion modules 101, social signals 171, web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) ongoing basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

In general, a raw signal can include various characteristics including one or more of: a time stamp, location information (e.g., lat/lon, GPS coordinates, etc.), context information (e.g., text expressly indicating a type of event), a signal type (e.g., social media, 911 communication, traffic camera feed, etc.), a signal source (e.g., Facebook, twitter, Waze, etc.), and content (e.g., one or more of: image, video, text, keyword, locale, etc.). Streaming signals 173 can include live video and/or non-live (previously stored) video.

For each type of raw signal, a corresponding ingestion module and signal processing module can interoperate to normalize the signal along Time, Location, Context (TLC) dimensions. For example, social content ingestion modules 174 and social signal processing module 181 can interoperate to normalize social signals 171 into TLC dimensions. Similarly, web content ingestion modules 175 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can utilize "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity and resource consumption of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time (dimension) 123A, location (dimension) 124A, context (dimension) 126A, content 127A, type 128A, and source 129A to event detection infrastructure 103. Similarly, signal ingestion modules 101 can send normalized signal 122B, including time (dimension) 123B, location (dimension) 124B, context (dimension) 126B, content 127B, type 128B, and source 129B to event detection infrastructure 103.

Event Detection

Figure 1B:
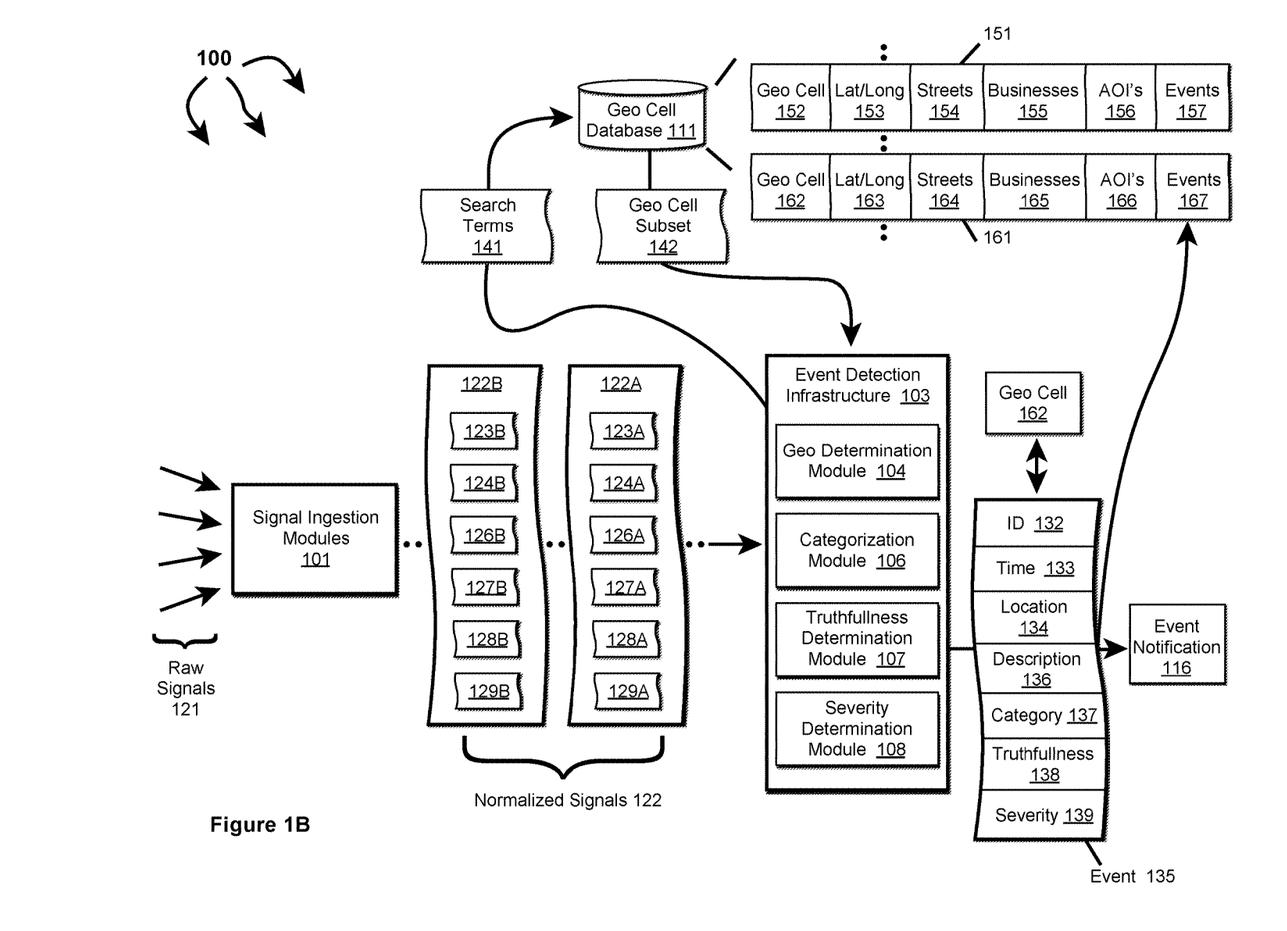
FIG. 1B illustrates an example computer architecture that facilitates detecting events from normalized signals.

FIG. 1B depicts part of computer architecture 100 that facilitates detecting events. As depicted, computer architecture 100 includes event detection infrastructure 103, geo cell database 111 and event notification 116. Geo cell database 111 and event notification 116 can be connected to (or be part of) a network with signal ingestion modules 101 and event detection infrastructure 103. As such, geo cell database 111 and event notification 116 can create and exchange message related data over the network.

As described, in general, on an ongoing basis and concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Event detection infrastructure can likewise detect changes to existing (planned and unplanned) events. Since, normalized signals are normalized to include Time, Location, and Context dimensions (vectors), event detection infrastructure 103 can handle normalized signals in a more uniform manner. Handling signals in a more uniform manner increases event detection and event change detection efficiency and effectiveness and also reduces resource consumption. For example, Time, Location, and Context vectors of different normalized signals can be compared (instead of comparing along numerous, and possibly differing and/or non-uniform, other dimensions).

Event detection infrastructure 103 can also determine an event truthfulness (e.g., erroneous detection results, detections based on tampered source data, detections of fictional or staged events), event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension and/or can be represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension and/or can be represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field). Sufficiently precise geo cells can be used to increase the practicality of storing matching content.

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162). Other events can be stored in events 167 or other geo cell entries as the events are detected. As such, geo cell database can store an event history per cell. Other modules can refer to the event history when appropriate.

Event detection infrastructure 103 can also send event 135 to event notification module 116. Event notification module 116 can notify one or more entities about event 135.

Figure 2:
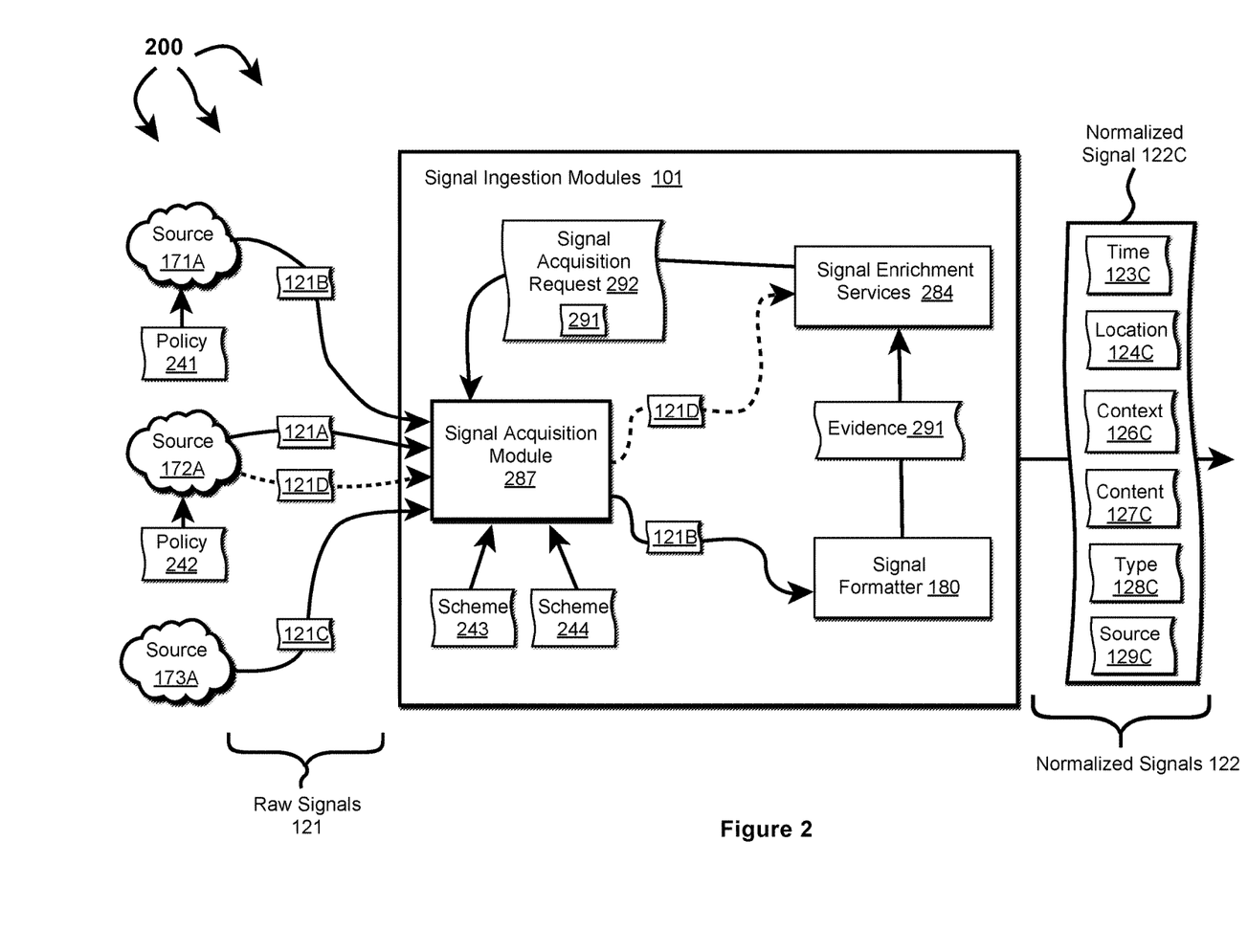
FIG. 2 illustrates an example computer architecture that facilitates normalizing an insufficient raw signal based on characteristics of a related raw signal.

Normalizing an Insufficient Raw Signal Based on Characteristics of a Related Raw Signal FIG. 2 illustrates an example computer architecture 200 that facilitates normalizing an insufficient raw signal based on characteristics of a related raw signal. As depicted in computer architecture 200, signal ingestion modules 101 further include signal acquisition module 287 and signal enrichment services 284. Signal acquisition module 287 can span, include, and/or be integrated with social content ingestion modules 174, web content ingestion modules 175, and stream content ingestion modules 176 to acquire any of social signals, web signals, and streaming signals (as well as other raw signals 121). For example, signal acquisition module 287 can acquire raw signals 121B, 121A and 121D, and 121C from sources 171A, 171B, and 171C respectively. Source 171A can be a social signal source included in social signals 171. Source 172A can be a web signal source included in web signals 172. Source 173A can be a streaming signal source included in streaming signals 173.

Each of ingested raw signals 121A, 121B, 121C, 1212D, etc. can include one or more of: a time stamp, location information (e.g., lat/lon, GPS coordinates, etc.), context information (e.g., text expressly indicating a type of event), a signal type (e.g., social media, 911 communication, traffic camera feed, etc.), a signal source (e.g., Facebook, twitter, Waze, etc.), and content (e.g., one or more of: image, video, text, keyword, locale, etc.). Any streaming signals can include live video and/or non-live (previously stored) video. Raw signals may include all or less than all of a time stamp, location information, context information, signal type, signal source, and content. Information included in a raw may also be more or less accurate and/or precise. For example, a location of "San Francisco" is less accurate than a level 9 geo hash. Thus, even when a raw signal includes information, the information may be insufficient for normalization due to lack of precisions and/or accuracy.

Signal sources can regulate (e.g., place limits on) when and how raw signals can be acquired, such as, for example, signal acquisition volume per minute. Signal acquisition module 287 can implement corresponding signal access schemes. Signal access schemes can be used to maximize raw signal acquisition per source while holding back some signal acquisition volume. The held back signal acquisition volume can be used to accommodate on-demand signal acquisition request without violating corresponding signal access policies.

For example, signal acquisition from source 171A can be regulated by policy 241. Policy 241 defines limits on when and how raw signals can be acquired from source 171A, such as, for example, a signal acquisition volume limit per minute. Scheme 243 can define how to maximize signal acquisition from source 171A without violating policy 241. For example, scheme 243 can define acquiring a specified signal volume on an ongoing basis while holding back some signal volume to accommodate on-demand signal acquisition requests. Accordingly, signal acquisition module 287 can maximize raw signal acquisition from source 171A without violating policy 241.

Similarly, signal acquisition from source 172A can be regulated by policy 242. Policy 242 defines limits on when and how raw signals can be acquired from source 172A, such as, for example, a signal acquisition volume limit per minute. Scheme 244 can define how to maximize signal acquisition from source 172A without violating policy 242. For example, scheme 244 can define acquiring a specified signal volume on an ongoing basis while holding back some signal volume to accommodate on-demand signal acquisition requests. Accordingly, signal acquisition module 287 can maximize raw signal acquisition from source 173A without violating policy 242.

As such, data ingestion module(s) 101 can ingest raw signals 121, including signals from source 171A, source 172A, and source 173A, on an ongoing basis and in essentially real-time. More specifically, signal acquisition module 287 can acquire signal 121B (in accordance with scheme 243), signals 121A and 121D (in accordance with scheme 244), and signal 121C from sources 171A, 172A, and 173A respectively.

Some ingested/acquired raw signals may provide evidence of a live event and others may not. Some ingested/acquired raw signals may also include sufficient information to normalize into a TLC, format and others may not. Formatter 180 can examine characteristic of ingested/acquired raw signals for evidence of live events and to determine sufficiency for normalization. Signal formatter 180 may discard raw signals that do not include evidence of a live event.

Signal formatter 180 can normalize raw signals that include evidence of a live event. When characteristics of a raw signal are sufficient for normalizing the raw signal, signal formatter 180 can normalize the raw signal into a TLC format based on the characteristics of the raw signal. When characteristics of a raw signal are insufficient for normalization, signal formatter can send the evidence of the live event to signal enrichment services 284.

In response to receiving live event evidence, signal enrichment services 284 can formulate a signal acquisition request including (at least a portion of) the live event evidence. Signal enrichment services 284 can send the signal acquisition request to signal acquisition module 287 to (on-demand) request an additional signal related to the live event evidence (and thus related to the examined raw signal). Based on a signal acquisition request, signal acquisition module 287 can query one or more signal sources (e.g., from among sources 171A, 172A, and 172A) on-demand for any additional raw signals related to the examined raw signal. Any of the one or more signal sources including a related raw signal can return the related raw signal to signal acquisition module 287. Signal acquisition module 287 can send the related raw signal to signal enrichment services 284 and/or signal formatter 180. Since some signal acquisition volume is held back for on-demand requests (in accordance with schemes 243, 244, etc.), the on-demand request is unlikely to violate signal source acquisition policies.

In another aspect, signal acquisition module 287 may have acquired one or more related raw signals prior to receiving a signal acquisition request. For example, when a live event is occurring, multiple different raw signals related to the live event may be generated from multiple different signal sources. Thus, if characteristics of one raw signal are insufficient for normalization, one or more other raw signals may include supplemental information to remediate the insufficiency. Signal acquisition module 287 can return the one or more other raw signals to signal enrichment services 284 and/or signal formatter 180 in response to a signal acquisition request.

In one aspect, signal acquisition module 287 may have access to some related raw signals and may query signal sources for additional related raw signals. Characteristics of/information from any of these raw signals can be used to supplement an insufficient raw signal.

Signal enrichment services 284 can supplement characteristics of an examined raw signal with information from a related raw signal. Signal formatter 180 can normalize the examined raw signal into a TLC format using a combination of characteristics of the examined raw signal and the supplemental information. In one aspect, supplemental information includes characteristics of the related raw signal. The supplemental information can be used to derive any of: a time dimension, a location dimension, or a context dimension of the examined raw signal.

Figure 3:
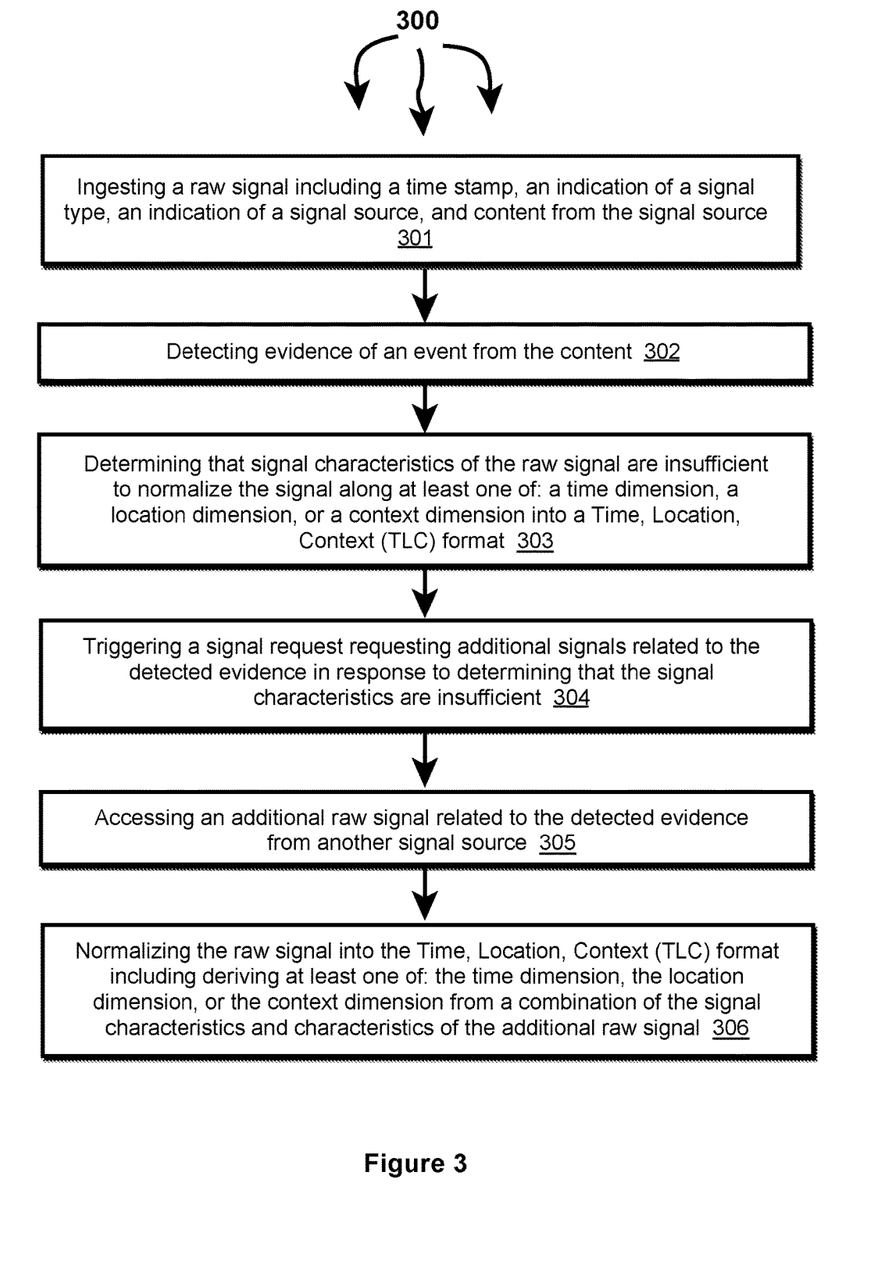
FIG. 3 illustrates a flow chart of an example method for normalizing an insufficient raw signal based on characteristics of a related raw signal.

FIG. 3 illustrates a flow chart of an example method for normalizing an insufficient raw signal based on characteristics of a related raw signal. Method 300 will be described with respect to the components and data in computer architecture 200.

Method 300 includes ingesting a raw signal including a time stamp, an indication of a signal type, an indication of a signal source, and content from the signal source (301). For example, signal acquisition module 287 can access raw signal 121B from source 171A. Raw signal 121B can include a time stamp, can indicate a signal type, can identify source 171A, and can include content from source 171A. In one aspect, signal acquisition module 287 accesses raw signal 121B in accordance with scheme 243 so as to not violate policy 241.

Signal acquisition module 287 can send raw signal 121B to signal formatter 180.

Method 300 includes detecting evidence of an event from the content (302). For example, signal formatter 180 can detect evidence 291 of an event from the characteristics, and including the content, of raw signal 121B. Method 300 includes determining that signal characteristics of the raw signal are insufficient to normalize the signal along at least one of: a time dimension, a location dimension, or a context dimension into a Time, Location, Context (TLC) format (303). For example, signal formatter 180 can determine that the signal characteristics of raw signal 121B are insufficient to normalize raw signal 121B along at least one of: a time dimension, a location dimension, or a context dimension into a TLC format. In response to detecting evidence 291 and insufficiency of the signal characteristics of raw signal 121B, signal formatter 180 can send evidence 291 to signal enrichment services 284. Signal enrichment services 284 can receive evidence 291 from signal formatter 180.

Method 300 includes triggering a signal request requesting additional signals related to the detected evidence in response to determining that the signal characteristics are insufficient (304). For example, in response to receiving evidence 291, signal enrichment services 284 can formulate signal acquisition request 292, including (at least a portion of) evidence 291. Signal enrichment services 284 can send signal acquisition request 292 to signal acquisition module 287. Signal acquisition module 287 can receive signal acquisition request 292 from signal enrichment services 284.

Method 300 includes accessing an additional raw signal related to the detected evidence from another signal source (305). For example, signal acquisition module 287 can compare evidence 291 (or the portion thereof) to other acquired raw signals to attempt to identify related raw signals. Alternately or in combination, signal acquisition module 287 can use evidence 291 (of the portion thereof) to formulate related signal queries. Signal acquisition module 287 can send related signal queries to signal sources (e.g., 171A, 172A, 173A, etc.) requesting signals related to evidence 291 (or the portion thereof). Either through prior acquisition or in response to a query, signal acquisition module 287 can access raw signal 121D. The characteristics of raw signal 121D can indicate a relationship to evidence 291 (or the portion thereof). Signal acquisition module 287 can send raw signal 121D to signal enrichment services 284 and/or signal formatter 180. Signal enrichment services 284 and/or signal formatter 180 can supplement raw signal 121B with characteristics of raw signal 121D to remediate any normalization insufficiencies.

Method 300 includes normalizing the raw signal into the Time, Location, Context (TLC) format including deriving at least one of: the time dimension, the location dimension, or the context dimension from a combination of the signal characteristics and characteristics of the additional raw signal (306). For example, signal enrichment services 284 and/or signal formatter 180 can normalize raw signal 121B into normalized signal 122C, including time 123C, location 124C, context 126C, content 127C, type 128C, and source 129C. Normalization can include deriving at least one of time 123C, location 124C, and context 126C from a combination of characteristics of raw signal 121B and characteristics of signal 121D.

Figure 4:
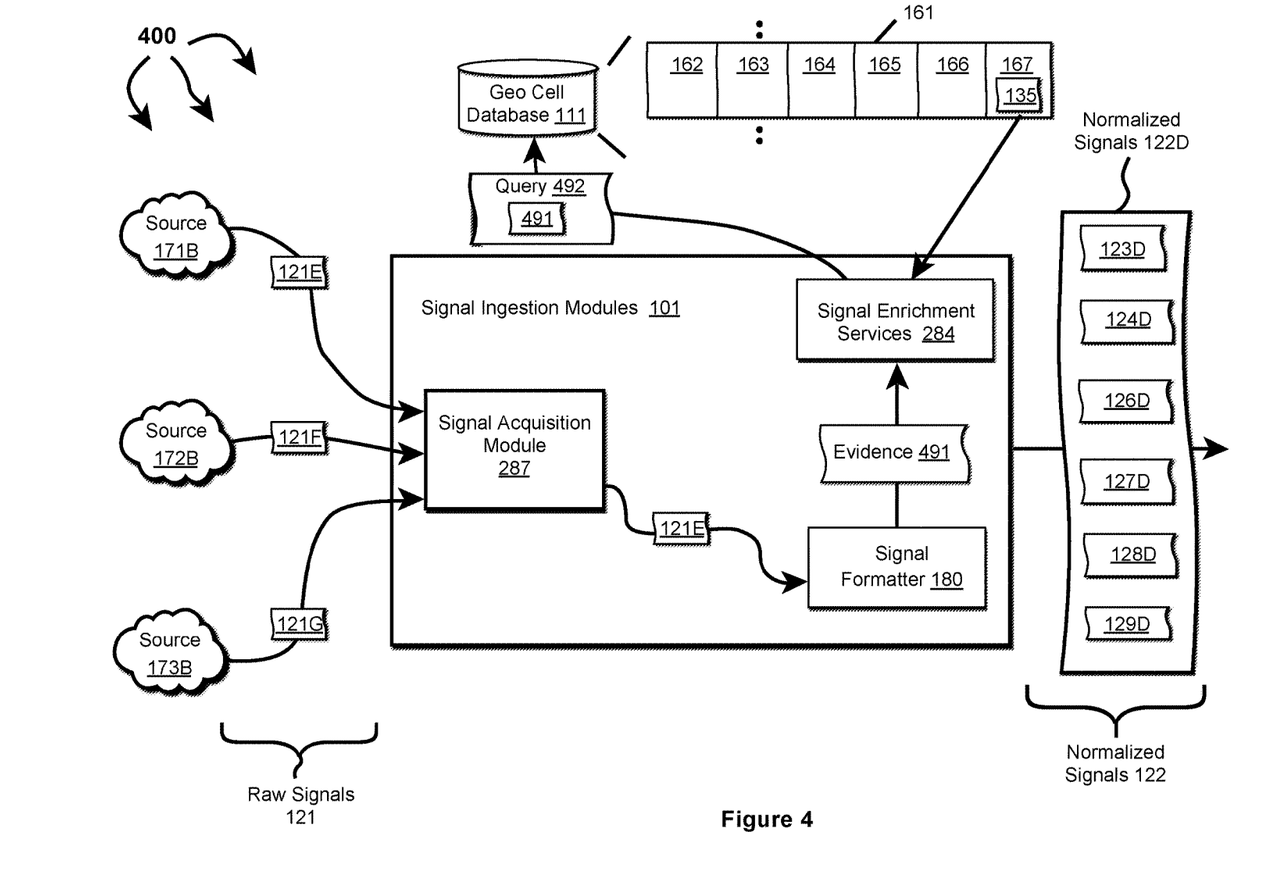
FIG. 4 illustrates an example computer architecture that facilitates normalizing an insufficient raw signal based on characteristics of a prior detected event.

Normalizing an Insufficient Raw Signal Based on Characteristics of a Prior Detected Event FIG. 4 illustrates an example computer architecture 400 that facilitates normalizing an insufficient raw signal based on characteristics of a prior detected event. As depicted in computer architecture 400, signal enrichment services 284 can query geo cell database 111. Queries of geo cell database 111 can include evidence of a live event (or portions thereof) identified by signal formatter 180. In response to a query, geo cell database 111 can return one or more prior detected events related to the evidence. Signal enrichment services 284 can remediate raw signal insufficiencies with information from the one or more prior events to facilitate normalizing a raw signal into a TLC format.

Data ingestion module(s) 101 can ingest raw signals 121, including signals from source 171B (included in social signals 171), source 172B (included in web signals 172), and source 173B (included in streaming signals 173), on an ongoing basis and in essentially real-time. More specifically, signal acquisition module 287 can acquire signal 121E, signal 121F, and signal 121G from sources 171B, 172B, and 173B respectively.

Figure 5:
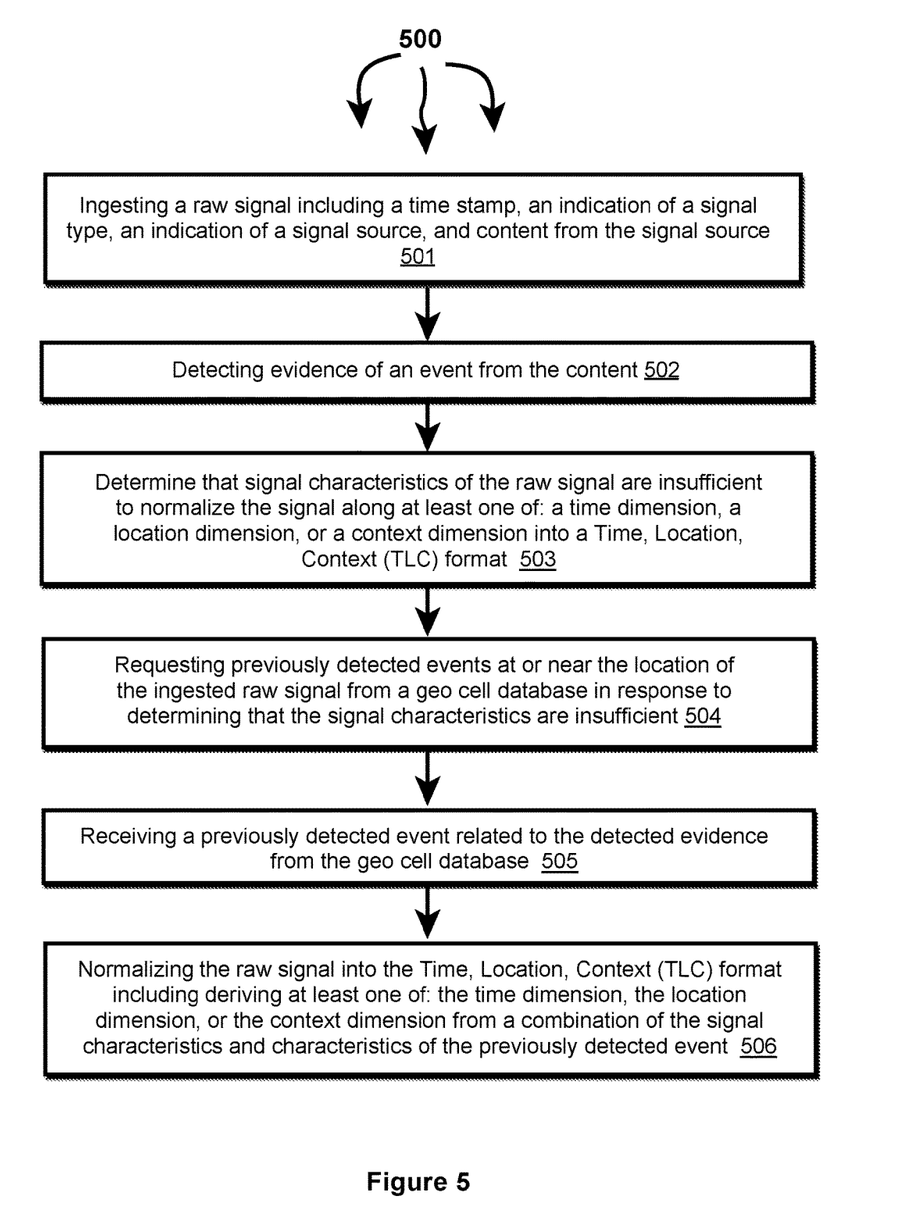
FIG. 5 illustrates a flow chart of an example method for normalizing an insufficient raw signal based on characteristics of a prior detected event.

FIG. 5 illustrates a flow chart of an example method 500 for normalizing an insufficient raw signal based on characteristics of a prior detected event.

Method 500 includes ingesting a raw signal including a time stamp, an indication of a signal type, an indication of a signal source, and content from the signal source (501). For example, signal acquisition module 287 can access raw signal 121E from source 171B. Raw signal 121E can include a time stamp, can indicate a signal type, can identify source 171B, and can include content from source 171B. Signal acquisition module 287 can send raw signal 121E to signal formatter 180. Method 500 includes detecting evidence of an event from the content (502). For example, signal formatter 180 can detect evidence 491 of an event from the characteristics, and including the content, of raw signal 121E.

Method 500 includes determining that signal characteristics of the raw signal are insufficient to normalize the signal along at least one of: a time dimension, a location dimension, or a context dimension into a Time, Location, Context (TLC) format (503). For example, signal formatter 180 can determine that the signal characteristics of raw signal 121E are insufficient to normalize raw signal 121E along at least one of: a time dimension, a location dimension, or a context dimension into a TLC format. In response to detecting evidence 491 and insufficiency of the signal characteristics of raw signal 121E, signal formatter 180 can send evidence 491 to signal enrichment services 284. Signal enrichment services 284 can receive evidence 491 from signal formatter 180.

Method 500 includes requesting previously detected events at or near the location of the ingested raw signal from a geo cell database in response to determining that the signal characteristics are insufficient (504). For example, in response to receiving evidence 491, signal enrichment services 284 can formulate query 492, including (at least a portion of) evidence 491. Signal enrichment services 284 can send query 492 to geo cell database 111. Geo cell database 111 can receive query from signal enrichment services 284.

Method 500 includes receiving a previously detected event related to the detected evidence from the geo cell database (505). Geo cell database 111 can compare evidence 491 (of the portion thereof) to prior detected events in geo cell entries. Events related to evidence 491 can be returned to signal enrichment services 284. For example, geo cell database 111 can determine that event 135 is related to evidence 491. Geo cell database 111 can return event 135 to signal enrichment services 284.

Method 500 includes normalizing the raw signal into the Time, Location, Context (TLC) format including deriving at least one of: the time dimension, the location dimension, or the context dimension from a combination of the signal characteristics and characteristics of the previously detected event (506). For example, signal enrichment services 284 and/or signal formatter 180 can normalize raw signal 121E into normalized signal 122D, including time 123D, location 124D, context 126D, content 127D, type 128D, and source 129D. Normalization can include deriving at least one of time 123D, location 124D, and context 126D from a combination of characteristics of raw signal 121E and characteristics of event 135.

Other Architectures for Normalizing Insufficient Raw Signals

Figure 6:
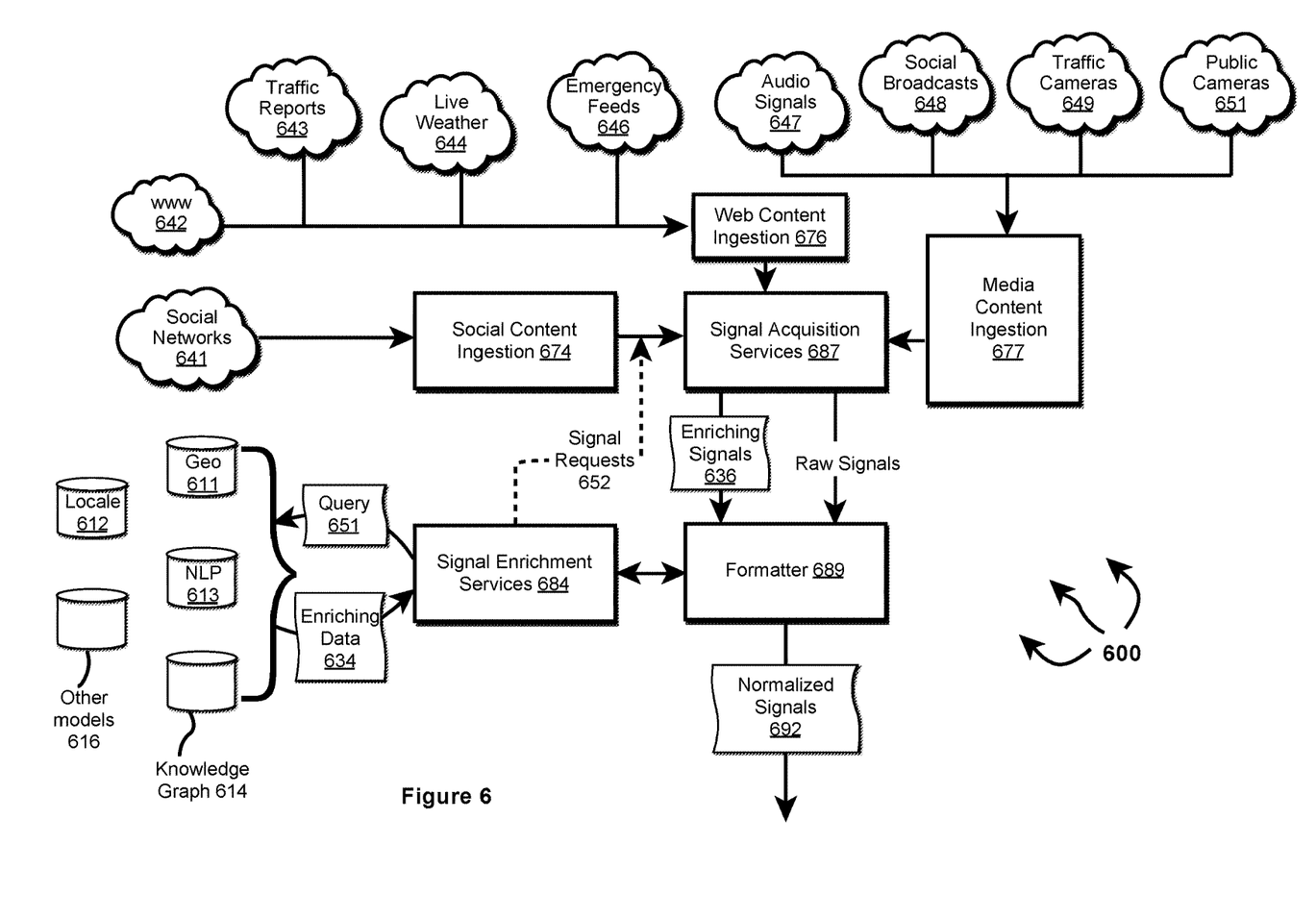
FIG. 6 illustrates an example of a more detailed computer architecture that facilitates normalizing an insufficient raw signal based on additional information.

FIG. 6 illustrates an example of a more detailed computer architecture 600 that facilitates normalizing an insufficient raw signal based on additional information.

As depicted, computer architecture 600 includes social content ingestion 674, web content ingestion 676, media content ingestion 677, signal acquisition services 687, signal enrichment services 684, formatter 689, geo database 611, local 612, NLP 613, knowledge graph 614, and other modules 616. Social content ingestion 674, web content ingestion 676, media content ingestion 677, signal acquisition services 687, signal enrichment services 684, formatter 689, geo database 611, local 612, NLP 613, knowledge graph 614, and other modules 616 can be connected to (or be part of) a network, such as, for example, a system bus, a Local Area Network ("LAN"), a Wide Area Network ("WAN"), and even the Internet. Accordingly, social content ingestion 674, web content ingestion 676, media content ingestion 677, signal acquisition services 687, signal enrichment services 684, formatter 689, geo database 611, local 612, NLP 613, knowledge graph 614, and other modules 616 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, social content ingestion 674 can ingest raw signals from social networks 641 and prepare the raw signals for signal acquisition services 687. Similarly, web content ingestion 676 can ingest raw signals from www 642, traffic reports 643, live weather 644, and emergency feeds 646 and prepare the raw signals for signal acquisition services 687. Likewise, media content ingestion 677 can ingest raw signals from audio signals 647, social broadcasts 648, traffic cameras 649, and public cameras 651 and prepare the raw signals for signal acquisition services 687.

Signal acquisition services 687 (e.g., similar to signal acquisition module 287) can send raw signals to formatter 689. Formatter 689 (e.g., similar to formatter 180) examines raw signals to determine raw signals include evidence of a live event and to determine if characteristics of a raw signal are sufficient to normalize the raw signal. If a raw signal does not provide evidence of a live event, formatter 689 may discard the raw event. If a raw signal does provide evidence of a live event and characteristics of the raw event are sufficient to normalize the raw event, formatter 689 can normalize the raw event into a TLC format. Formatter 689 can send normalized signals to an event detection infrastructure, such as, for example, event detection infrastructure 103.

If a raw signal does provide evidence of a live event and characteristics of the raw event are insufficient to normalize the raw event, formatter 689 sends evidence of the live event to signal enrichment services 684. Signal enrichment services 684 (e.g., similar to signal enrichment services 284) can obtain supplemental information to remediate raw signal insufficiencies. Supplemental information can include characteristics of one or more related signals and/or characteristics of one or more related events.

Signal enrichment services 684 can send signal request 652, including live event evidence, to signal acquisition services 687. In response, signal acquisition services 687 can acquire enriching signals 636. One or more of enriching signals 636 may already be known to signal acquisition services 687. Signal acquisition services 687 can also query one or more of social content ingestion 674, web content ingestion 676, and media content ingestion 677 to acquire one or more other of enriching signals 636.

Signal enrichment services 684 can also formulate query 651, including live event evidence. Signal enrichment services 684 can send query 651 to one or more of geo 611, locale 612, NLP 613, knowledge graph 614, and other modules 616. The one or more of geo 611, locale 612, NLP 613, knowledge graph 614, and other modules 616 can return enriching data 634 back to signal enrichment services 684. Signal enrichment services 684 can send the enriching data on to formatter 689.

Formatter 689 can normalize a raw signal into a normalized signal 692 using a combination of characteristics of the raw signal and characteristics of an enriching signal 626 and/or enriching data 634.

Accordingly, aspects of the invention facilitate acquisition of live, ongoing forms of data into an event detection system. Signals from multiple sources of data can be combined and normalized for a common purpose (of event detection). Data ingestion, event detection, and event notification process data through multiple stages of logic with concurrency.

A unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

In one aspect, the entity analyzes data (signals) from different data providers (signal sources) to attempt to identify occurring live events (e.g., fire, police response, mass shooting, traffic accident, natural disaster, storm, active shooter, concerts, protests, etc.).

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer-implemented signal normalization method comprising:
    ingesting a raw signal including a time stamp, an indication of a signal type, an indication of a signal source, and content from the signal source;
    detecting evidence of an event from the content;
    determining that signal characteristics of the raw signal are insufficient to normalize the raw signal along at least one of: a time dimension, a location dimension, or a context dimension into a Time, Location, Context (TLC) format;
    triggering a signal request requesting additional signals related to the detected evidence in response to determining that the signal characteristics are insufficient;
    accessing an additional raw signal related to the detected evidence from another signal source; and
    normalizing the raw signal into the Time, Location, Context (TLC) format including deriving at least one of: the time dimension, the location dimension, or the context dimension from a combination of the signal characteristics and characteristics of the additional raw signal.

2. The method of claim 1, wherein determining that signal characteristics of the raw signal are insufficient to normalize the raw signal comprises determining that that the raw signal lacks sufficiently accurate location information.

3. The method of claim 1, wherein determining that signal characteristics of the raw signal are insufficient to normalize the raw signal comprises determining that that the raw signal lacks sufficiently accurate context information.

4. The method of claim 1, further comprising sending the signal request to one or more other signal sources.

5. The method of claim 4, wherein accessing an additional raw signal related to the detected evidence from another signal source comprises accessing an additional raw signal returned from the one or more other signal sources in response to the signal request.

6. The method of claim 1, wherein normalizing the raw signal into the Time, Location, Context (TLC) format comprises deriving the location dimension of the raw signal from a combination of the signal characteristics and characteristics of the additional raw signal.

7. The method of claim 1, further comprising detecting an event of interest to one or more entities based on the time dimension, the location dimension, or the context dimension of the normalized raw signal.

8. A computer-implemented signal normalization method comprising:
    ingesting a raw signal including a time stamp, an indication of a signal type, an indication of a signal source, and content from a signal source;
    detecting evidence of an event at a location from the content;
    determining that signal characteristics of the raw signal are insufficient to normalize the raw signal along at least one of: a time dimension, a location dimension, or a context dimension into a Time, Location, Context (TLC) format;
    requesting previously detected events at or near the location of the ingested raw signal from a geo cell database in response to determining that the signal characteristics are insufficient;
    receiving a previously detected event related to the detected evidence from the geo cell database; and normalizing the raw signal into the Time, Location, Context (TLC) format including deriving at least one of: the time dimension, the location dimension, or the context dimension from a combination of the signal characteristics and characteristics of the previously detected event.

9. The method of claim 8, wherein determining that signal characteristics of the raw signal are insufficient to normalize the raw signal comprises determining that that the raw signal lacks sufficiently accurate location information.

10. The method of claim 8, wherein determining that signal characteristics of the raw signal are insufficient to normalize the raw signal comprises determining that the raw signal lacks sufficiently accurate context information.

11. The method of claim 8, wherein requesting previously detected events comprises:
formulating a query that includes the detected evidence; and
sending the query to the geo cell database.

12. The method of claim 8, wherein normalizing the raw signal into the Time, Location, Context (TLC) format comprises deriving the location dimension of the raw signal from a combination of the signal characteristics and characteristics of the previously detected event.

13. The method of claim 8, further comprising detecting an event of interest to one or more entities based on the time dimension, the location dimension, or the context dimension of the normalized raw signal.

14. A computer-implemented signal normalization method comprising:
ingesting a raw signal including a time stamp, an indication of a signal type, an indication of a signal source, and content from a signal source;
detecting evidence of an event at a location from the content;
determining that signal characteristics of the raw signal are insufficient to normalize the raw signal along at least one of: a time dimension, a location dimension, or a context dimension into a Time, Location, Context (TLC) format;
obtaining supplemental information related to the detected evidence from an additional raw signal and a previously detected event;
enriching the raw signal with the supplemental information; and
normalizing the raw signal into the Time, Location, Context (TLC) format including deriving at least one of: the time dimension, the location dimension, or the context dimension from a combination of the signal characteristics and the supplemental information.

15. The method of claim 14, further comprising:
detecting an event of interest to one or more entities based on the time dimension, the location dimension, or the context dimension of the normalized raw signal; and
notifying the one or more entities about the event of interest.

\* \* \* \* \*